United States Patent [19]
Bylsma

[11] 3,902,589
[45] Sept. 2, 1975

[54] ROLLER CONVEYOR SYSTEM

[75] Inventor: Jay M. Bylsma, Spring Lake, Mich.

[73] Assignee: Ermanco Incorporated, Grand Haven, Mich.

[22] Filed: July 20, 1973

[21] Appl. No.: 381,211

[52] U.S. Cl. .............................. 198/127 R
[51] Int. Cl.² ............................. B65G 39/00
[58] Field of Search ............ 198/127 R, 127 E, 202; 74/240; 226/15, 190–193

[56] References Cited
UNITED STATES PATENTS

| | | | |
|---|---|---|---|
| 2,030,816 | 2/1936 | Fenton .................. | 198/127 R |
| 3,018,935 | 1/1962 | Maddock .............. | 226/193 |
| 3,132,785 | 5/1964 | Kunz ..................... | 226/190 |
| 3,337,022 | 8/1967 | Merry ................... | 198/127 R |
| 3,518,944 | 7/1970 | Patin ..................... | 198/127 R |
| 3,650,375 | 3/1972 | Fleischauer et al. .. | 198/127 R |

Primary Examiner—Evon C. Blunk
Assistant Examiner—Jeffrey V. Nase
Attorney, Agent, or Firm—Lockwood, Dewey, Zickert & Alex

[57] ABSTRACT

The rollers of a conveyor system are individually driven in a given direction with a desired number of adjacent pairs being interconnected by one or more auxiliary belts to increase the torque applied thereto in addition to the individually applied torque. Horizontal and endwise upwardly inclined pass lines of the rollers are arranged to elevate cartons at a substantially steeper inclination than is possible without the auxiliary belts. The leading bottom corners or edges of cartons or boxes on leaving one pass line and entering another at an angle thereto are prevented from nosing into the space between the rollers at the intersection of the pass lines.

6 Claims, 4 Drawing Figures

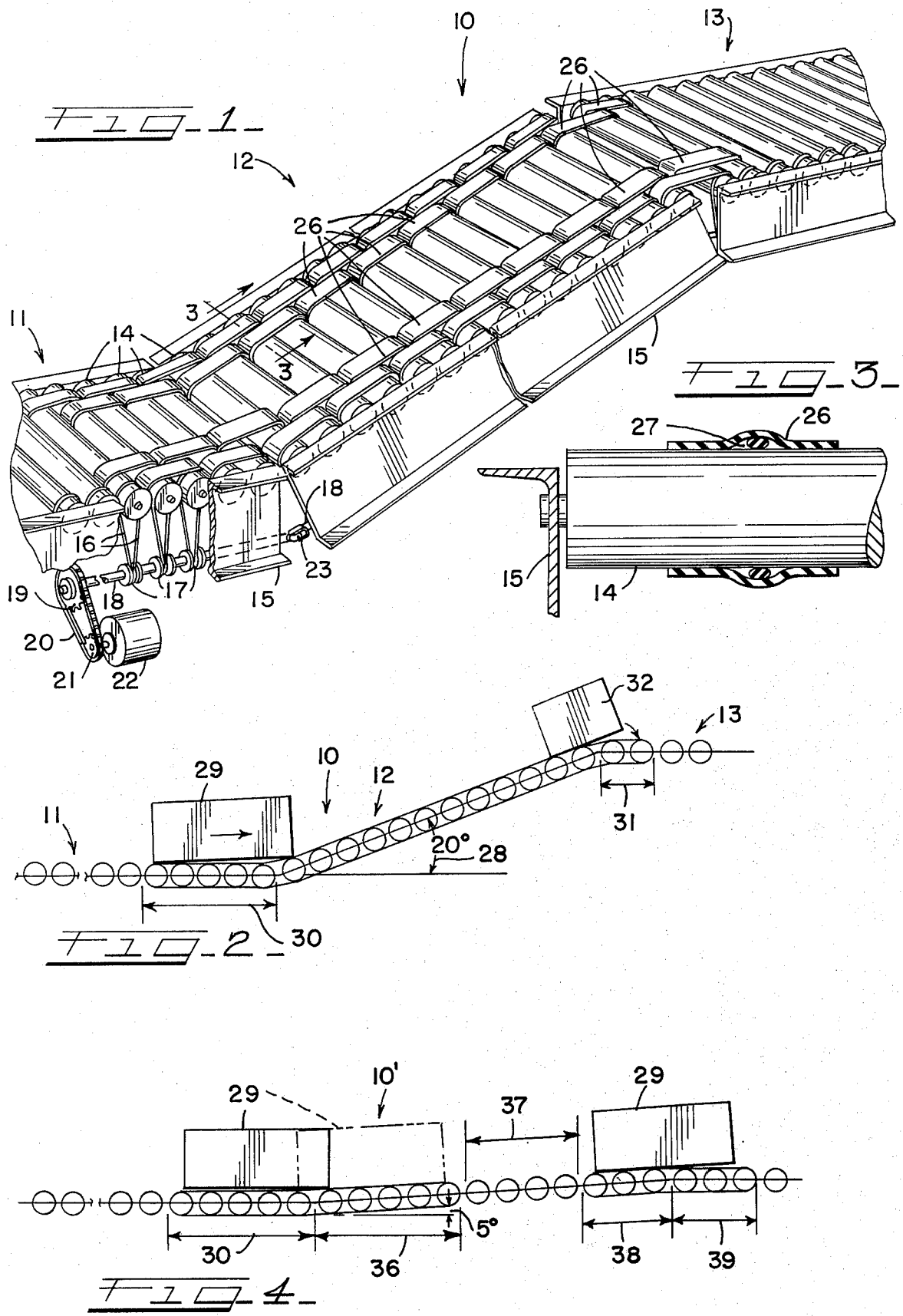

ROLLER CONVEYOR SYSTEM

This invention relates, generally, to conveyor systems, and it has particular relation to conveyors provided with individually driven rollers.

The conveyor system disclosed herein is an improvement over conveyor systems of the type disclosed in U.S. Pat. No. 3,621,982, issued Nov. 23, 1971 to Fleishauer et al. This patent shows a horizontal pass line of parallel spaced rollers that are individually driven for moving packages, such as boxes, cartons and the like, in a horizontal plane. Such an arrangement can be employed in conjunction with an upwardly inclined endwise related similar pass line for elevating the packages. The angle of inclination from the horizontal of this combination of pass lines using steel rollers is relatively small, for example, not more than 5°, since the coefficient of friction of the rollers surfaces is relatively low, particularly after they have become polished through use. In other words at angles steeper than about 5° a roller conveyor acts like a slide or chute.

When the endwise arranged horizontal and inclined passes of individually driven rollers are employed, certain limitations are involved. The first or lowermost roller of the inclined pass is slightly higher than the adjacent roller of the horizontal pass and tends to act as a stop to the forward movement of the leading bottom edge of a package. There is also a tendency for the leading edge to enter or "nose" into the space between the two rollers. If enough torque should be available to cause the leading edge or corner to rise onto the first (i.e., lowermost) roller of the inclined pass, then only the forward and trailing bottom edges of the package are engaged on rollers thereby requiring that only two rollers provide the torque and friction to move the package further up the inclined pass.

At the upper end of an inclined conveyor pass, a package remains in the plane of the pass until its center of gravity is advanced far enough to cause it to flop onto a connecting horizontal conveyor section or pass. Just prior to this flop or transfer only a few of the upper rolls (the exact number depending on the length and center of gravity of a package) engage the bottom of the package and likewise just after the transfer only the first few rollers engage the package bottom. Thus, at both the lower and upper ends of an inclined conveyor section the torque available for moving the package is limited because of the reduced numbers of rollers having driving engagement with the bottom of a package.

Among the objects of this invention are: to provide for increasing the torque available to move packages along the rollers of a conveyor in which the rollers are individually driven; to interconnect adjacent rollers in such manner that driving torque is cumulatively interchanged between them, and thereby increase the permissible steepness of a pass line or plane of power rollers; to employ one or more belts embracing adjacent rollers, the belts being in staggered relation and providing the effect of a continuous flat belt; to arrange horizontal and endwise aligned inclined passes of individually driven rollers with adjacent pairs of rollers being interconnected by belts so as to facilitate transfer of packages between a horizontal pass line and an inclined pass line; to provide for the inclined pass of rollers to elevate packages to a horizontal pass of individually driven rollers the first two or three adjacent pairs of which are interconnected by one or more belts; and to maintain each belt in a predetermined position along a pair of adjacent rollers.

Certain additional objects of the invention will be apparent hereinafter.

In the drawings:

FIG. 1 is a fragmentary perspective view of a conveyor system of the individually driven roller type in which this invention is embodied.

FIG. 2 illustrates, diagrammatically, the functioning of the embodiment of the invention of FIG. 1.

FIG. 3 is a sectional view, of enlarged scale, taken generally along line 3—3 of FIG. 1.

FIG. 4 is a view, similar to FIG. 2, showing the inclined pass of rollers at a less steep angle of inclination.

Referring now to FIGS. 1–3, 10 designates, generally, a powered roller type conveyor which comprises a horizontal lower pass line indicated generally at 11, an endwise inclined pass line, indicated generally at 12, and an endwise horizontal upper pass line indicated generally at 13. Each of the pass lines 11, 12 and 13 is provided with parallel spaced rollers 14—14 that are suitably journaled between side frame channels 15—15. The rollers are individually driven as fully disclosed in the above patent, through round or O-ring belts 16—16 individual thereto. The belts 16 are trained over spools 17—17 slipably mounted on shafts 18, one of which has a driven sprocket 19 fastened thereto which is driven by a chain 20 from a drive sprocket 21 that is driven by a motor 22. The shafts 18 of the pass lines 11, 12 and 13 are interconnected by universal joints 23 to drive all of the rollers 14 in a forward direction from left to right (i.e., clockwise as viewed) by the motor 22.

In order to cumulatively distribute driving torque from the motor 22 between the rollers 14 and in the pass lines 11, 12 and 13 in addition to the torques individually applied through the belts 16 and to provide the effect of a continuous flat belt, pairs or sets of belts 26 embrace adjacent rollers 14 and have frictional driving connection therewith by being stretched therearound. The paris of belts 26 are staggered as shown along the rollers 14 in a non-interferring relation, as shown in FIG. 1.

The belts 16—16 and 26—26 should be formed of an elastomer such as natural rubber or synthetic rubber-like material and the belts 26—26 preferably should exhibit a high coefficient friction with conventional packaging material that will be conveyed thereon.

In order to hold the belts 26 in a predetermined position on a pair of adjacent rollers 14 and prevent the normal wandering movement thereof, "O" rings 27 formed of natural rubber or synthetic rubber-like material are placed on the rollers 14, as illustrated in FIG. 3. Initially each "O" ring 27 has a slightly less internal diameter than the outside diameter of its roller 14 to provide a stretch fit (e.g. a 15% stretch fit). When applied as shown, each "O" ring 27 is slightly flattened and functions as a crown for centering the respective belt 26. Only a single "O" ring is required for each belt 26.

FIG. 2 shows the pass line 12 extruding at an angle of inclination 28 of 20° from the horizontal pass line 11. The angle 28 can vary up to about 25°, depending somewhat on the widths and friction properties of the belts 26. For illustrative purposes, five of the rollers 14 are here shown at 30 (FIG. 2) as being interconnected by the pairs of belts 26. This number of rollers 14 will accommodate package 29. For longer packages a correspondingly greater number of the rollers 14 in the pass line 11 should be interconnected by the belts 26 at the discharge end (i.e., right as shown) of the lower pass line 11.

The package 29, as shown in FIG. 2, has started up the inclined pass line 12. Its leading edge overlies the lowest roller 14 of the pass line 12 while its trailing edge overlies the rearmost of the rollers 30. The belts 26 prevent the forward bottom of package 29 edge from "nosing" into the space between the frontmost of rollers 30 and the lowest roller 14 of pass line 12. Since the bottom package 29 in the position shown would normally contact only two of the rollers 14, these rollers would ordinarily be required to supply all of the torque necessary to move the package 29 forwardly and to lift it, and ordinarily they would not be able to do so. However, this is readily accomplished and adequate torque is provided by means of the interconnecting belts 26. The surfaces of the belts 26 preferably are such as to propel the package 29 upwardly without it slipping backwards. When the relatively long package 29 reaches the upper discharge end of the inclined pass line 12, the leading end of the package 29 will project unsupported beyond the last or uppermost roller 14 of the inclined pass line 12 thereby reducing the number of rollers 14 having driving and support contact with the bottom of the packages. However, the uppermost rollers 14 in the inclined pass line 12 that have final support and propelling contact with the bottom of the package 29 will be receiving adequate additional driving torque from adjacent rollers 14 through the belts 26. The package continues to be propelled upwardly until its center of gravity is shifted when it flops onto the adjacent rollers 31 of the upper horizontal pass line 13. By linking these rollers 31 by means of belts 26 with adjacent rollers they will have sufficient torque applied to convey the package 29 along the upper pass line 13.

In FIG. 2 a relatively short package 32 is shown just prior to flopping down onto the rollers 31 from the upper end of pass line 12. The short package 32 is readily transferred from the lower pass line 11 to the inclined pass line 12 and thence to the upper pass line 13 generally in the same manner as the relatively longer package 29 is conveyed.

The conveyor system 10' as shown in FIG. 4 is arranged with the inclined pass line 12 at an angle of 5° which is indicated at 35. When so arranged, it is necessary to provide only a group of the lowermost rollers 14, indicated at 36, with the interconnecting belts 26 in order to transfer propel the relatively long package 29 from the full line position to the broken line position. Since the angle 35 is only 5°, the rollers 14, indicated at 37, need not be interconnected by the belts 26. However, when the package 29 is being discharged at the upper end of the inclined pass line 12, only the last three rollers 14 shown at 38 (in the case of a package of the length of package 29) will have support and driving relation with the bottom of the package, and therefore these three rollers must supply all of the torque and friction to propel the package to the place where it will flop onto the upper pass line 13. As soon as the package 29 flops onto the upper pass line 13, only the first three rollers 14 shown at 39 are engaged by the package 29. To provide the necessary torque, the belts 26 are employed here to distribute the torque in the manner described. It will be seen that the torque applied to the individual rollers 14 in groups 38 and 39 by the belts 16 is cumulative so that even though only one group of rollers may be engaging a package at any one time that group will be receiving the torque applied to both groups.

While the present invention is particularly useful in facilitating the transfer of packages or objects between the intersections of straight pass lines in powered roller conveyors and in conveying packages or objects up relatively steep pass lines, it is also useful in connection with generally horizontal pass lines when it is desired for any reason to apply increased torque to groups of individually powered rollers. The ability to cumulate or transfer torque from adjacent rollers also permits a reduction in the torque individually applied to the rollers.

While in the embodiments of the present invention the torque to particular rollers may be multiplied by reason of receiving torque from adjacent rollers interconnected by the flat belts 26, thereby increasing driving force on the belts 26, the maximum force developed is self-limiting. Thus, the maximum force that can be transmitted to an individual roller 14 by its associated belt 16 is a function of the coefficient of friction of the associated spool 17 on the drive shaft 18 times the load, which is, the stretch or resilience of the belt 16. If the maximum driving torque that can be transmitted to a roller 14 is, say, 5 units, and flat belts 26 interconnect five rollers, then a maximum force of 25 units can be exerted. If a greater load is placed on the five belts, such as by a very heavy package with a high coefficient of friction between the bottom of the package and the flat belts 26, or by a package on the flat belts 26 being blocked, then slippage occurs between the spools 17 and the drive shaft 18 as described in U.S. Pat. No. 3,621,982.

This slippage constitutes a valuable safety feature which is not obtainable in conveyors presently used for moving articles up relatively steep pass lines which are provided with a continuously moving belt the surface of which has a very high coefficient of friction. If for any reason the discharge of the line pass is blocked so that packages cannot freely progress, the very high torque of the moving belt coupled with the high friction surface will cause the accumulating cartons to erupt, buckle or at least be damaged on the bottoms. The slippage of the spools 17 on the drive shaft 18 when maximum load is reached prevents such damage from occuring.

It will be seen that several changes may be made in the embodiments of the invention described above in connection with the accompanying drawings without departing from the spirit and scope of the invention. Thus, instead of each belt 26 embracing only juxtaposed or immediately adjacent rollers, a belt 26 can embrace a pair of rollers separated by one or more intermediate rollers. Instead of using the belts 26—26 in pairs, they may be used either singly or three or more at a time.

While the utility of the invention has been described primarily in connection with transferring packages from a lower horizontal pass line to an upwardly inclined pass line and then from the upper end of the inclined pass line to an upper horizontal pass line, it will be understood that the invention has utility and offers advantages when the direction of travel is in the reverse and the packages go down the inclined pass line. In doing so by having adjacent rollers drivingly interconnected in series a braking action is imparted and the packages can be conveyed down steeper inclines without attaining excessive speeds. The transfer between the bottom roller of the inclined section to the adjacent roller on the horizontal section is also facilitated.

I claim:

1. In a live roller conveyor, including a plurality of oriented individually powered, circumferentially grooved, adjacent rollers having a common direction of rotation and defining at least a first pass line tangent to the upper surfaces of said rollers therein and a second pass line tangent to the upper surfaces of said rollers therein with said first and second pass lines intersecting at an angle of at least 5° and with the terminal rollers at the intersection forming one pair of adjacent rollers, a drive shaft extending generally parallel to each pass line and generally transversely to said rollers therein, each of said rollers being driven by a taut endless elastomeric belt of round cross-section which is operatively associated with, and driven by, each said shaft, the improvement comprising, means for providing the cumulative transfer of driving torque between said two rollers in said one pair of adjacent terminal rollers at said intersection, said means including at least one flat belt embracing only said one pair of adjacent terminal rollers at said intersection and having frictional engagement therewith, whereby torque applied to each of said two rollers through said round belts drivingly connect therewith is transmittable through said flat belt to the other roller of said one pair.

2. In a conveyor according to claim 1, a single stretched "O" ring on at least one of said one pair of adjacent rollers to maintain said flat belt in a predetermined position thereon.

3. In a conveyor according to claim 1, each roller drivingly interconnected to another adjacent roller being embraced by two pairs of said flat belts with one pair embracing one roller and only the next adjacent roller to one side of said one roller and with the other pair embracing said one roller and only the next adjacent roller on the other side.

4. In a conveyor according to claim 3, said pairs of flat belts embracing each roller being in staggered relation thereon whereby the effect of a continuous flat belt is provided.

5. In a conveyor according to claim 1, wherein a plurality of pairs of adjacent rollers in addition to said one pair of terminal rollers at said intersection are embraced by said driving belts with each roller in each additional pair having at least one belt embracing it and only the adjacent roller on one side and at least one belt embracing it and only the adjacent roller on the other side.

6. A conveyor according to claim 1, wherein said angle defined by said first and second pass lines ranges from 5° to 25°.

* * * * *